United States Patent [19]

Siarto

[11] 4,200,182
[45] Apr. 29, 1980

[54] METHOD OF MACHINING

[75] Inventor: Andrew V. Siarto, West Bloomfield, Mich.

[73] Assignee: Siarto Machine & Tool Co., Inc., Novi, Mich.

[21] Appl. No.: 942,221

[22] Filed: Sep. 14, 1978

Related U.S. Application Data

[62] Division of Ser. No. 801,181, May 27, 1977, abandoned.

[51] Int. Cl.² .......................................... B23P 23/00
[52] U.S. Cl. .................................. 198/617; 29/38 C; 74/813 L; 104/46; 198/345; 408/71; 409/221; 414/744; 414/786
[58] Field of Search ............... 414/744, 786; 29/38 C; 74/813 R, 813 C, 813 L, 816, 817, 818, 819, 820; 198/345, 346, 803, 859, 617; 104/46; 408/71; 409/165, 221

[56] References Cited

U.S. PATENT DOCUMENTS

| 1,058,656 | 4/1913 | Bean | 74/813 L X |
| 1,636,167 | 7/1927 | Bozsin | 74/813 L X |
| 1,859,111 | 5/1932 | Rock | 74/817 X |
| 2,967,440 | 1/1961 | Hunter | 74/817 |
| 3,048,059 | 8/1962 | Cross | 74/819 |
| 3,120,134 | 2/1964 | Sweeney | 74/823 |
| 3,177,740 | 4/1965 | Firestone et al. | 74/826 |
| 3,609,838 | 10/1971 | Wiest | 408/44 X |
| 3,613,483 | 10/1971 | Cinadr | 74/813 L X |
| 4,130,920 | 12/1978 | Siarto | 29/38 R |

FOREIGN PATENT DOCUMENTS

| 2531559 | 1/1976 | Fed. Rep. of Germany | 74/813 R |
| 1348125 | 3/1974 | United Kingdom | 74/813 L |

*Primary Examiner*—Robert G. Sheridan
*Assistant Examiner*—George F. Abraham
*Attorney, Agent, or Firm*—Cullen, Sloman, Cantor, Grauer, Scott & Rutherford

[57] ABSTRACT

A machine tool wherein an annular gear is rotatable in a horizontal plane to carry a plurality of pallets between adjacent peripherally arranged machine stations. The gear is lowered as each machine station is attained by the entry of gear support bearings into recesses in the underside of the gear. The pallets are supported on the gear for limited vertical and horizontal movement, and lowering of the gear positions the pallet on an abutment surface in rough alignment with the machining station. As the gear is further lowered, it is spaced from the pallet so as not to interfere with independent positioning of the pallet by power actuated positioning means located at each machining station. Thus, the pallet can be adjusted independently of the gear when the gear is in its lowered position, yet is carried by the gear when the gear is in its elevated position. After the machining operation is completed, the pallet is released from its clamped position, the gear is raised to again support the pallet, and the gear is rotationally actuated to carry the pallet into rough alignment with the next successive machine station.

2 Claims, 5 Drawing Figures

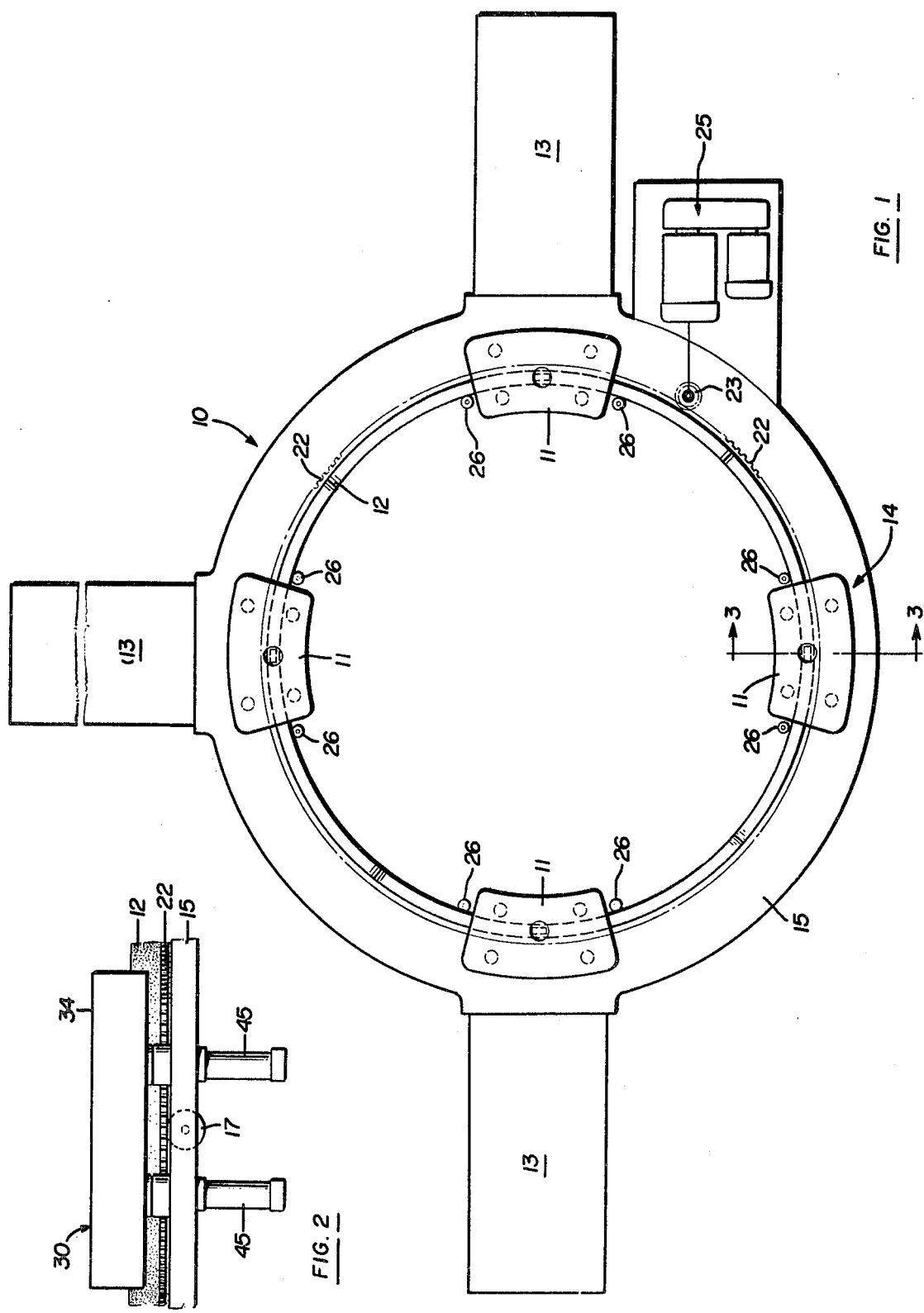

METHOD OF MACHINING

This is a division of application Ser. No. 801,181, filed May 27, 1977 now abandoned.

BACKGROUND OF THE INVENTION

The present invention constitutes a specific, needed improvement over the machine tool disclosed in U.S. Pat. No. 3,609,838 to H. Wiest.

In the Wiest patent, a pallet is carried by a rotary gear into rough alignment with successive, peripherally spaced machining locations. The pallet is connected to the gear by means of a "spring pack," wherein a spring urges the pallet and the parts loaded on the pallet vertically upwardly into spaced relation above the gear. At the machining location, the gear is halted, and hydraulically actuated clamping devices pull the pallet downwardly relative to the gear and against the load of the spring pack to fix the pallet to a machine base in accurate alignment for machining.

The spring pack must exert substantial force upwardly to enable the pallet and its load of parts to float above the gear during transport. This spring force must be overcome by the clamping mechanism in order to pull the pallet downwardly into clamped position at each machine station prior to machining. The spring load has proven to be critical in use, and each individual machine tool must be fitted with specific spring packs depending upon the weight of the pallet, the weight and number of the parts to be machined, etc. Additionally, the necessity of overcoming the spring force with the clamping elements reduces the net clamping force securing the pallet in position during machining.

It would be desirable from an economic and functional standpoint to eliminate the spring arrangement interposed between the pallet and the carrying gear.

BRIEF SUMMARY OF THE INVENTION

The present invention proposes a specific improvement over the Wiest structure wherein the gear is supported on the machine base for vertical movement; the gear being elevated for transport and being lowered at the machining location. The pallet is secured to the gear through a simple loss motion connection so that lowering of the gear initially lowers the pallet onto a support surface at the machining location, with further lowering of the gear spacing the gear from the pallet so as not to interfere with the subsequent positioning and clamping of the pallet.

In the operation of the device, the pallet is gravitationally urged against the upper surface of the gear by the weight of the pallet and the weight of the load superimposed thereon at all times when the gear is elevated, i.e., during arcuate movement of the gear to carry the pallet between successive machining stations. At the machining station, the gear is lowered, initially positioning the pallet on abutments at the machining location and finally moving the gear downwardly beneath the pallet. Positioning and clamping means are then actuated to finally position the pallet at the machining station and to clamp the pallet in position independently of the gear, the loss motion connection between the gear and the pallet accommodating such movement of the pallet relative to the gear. After machining and after release of the clamping elements, the gear is raised to lift the pallet from the abutments and to carry the pallet to the next successive machining station.

The present invention also proposes an extremely simple, effective means of raising and lowering the gear. In essence, the gear is positioned on rollers which contact the undersurface thereof, and these rollers enter cam recesses formed in the undersurface of the gear when the gear is positioned at each machining station, the cam recesses accommodating lowering of the gear at the desired station. By closely fitting the cam recesses to the rollers and by elevating and lowering the gear through a limited distance, about 0.015 inches, the gear motion is substantially completely vertical.

OBJECTS

It is an important object of the present invention to provide an improved machine tool of annular configuration and wherein a pallet is transferred between adjacent peripherally spaced machining stations by an annular gear which is raised and lowered to roughly position the pallet at a machining station and to accommodate clamping of the pallet to an exact location at the machining station independently of the gear.

It is another important object of the present invention to provide an annular carrier gear transporting a pallet to peripherally spaced machining stations, the gear being vertically lowered at each station to roughly position the pallet and the pallet being supported, adjusted and fixed at the station independently of the gear.

It is a further, and no less important, object of the present invention to provide an annular carrier gear for carrying a pallet between adjacent, peripherally spaced machining stations, the gear being in a first elevated station during such transport and being lowered to a second position at the machining station to roughly position the pallet at the station and to accommodate final location and clamping of the pallet at the station independently of the gear, the gear being raised and lowered by a plurality of support bearings engaging the undersurface thereof and enterable into recesses in the gear undersurface to accommodate lowering of the gear to its second position, and the pallet being positioned on a support during the lowering of the gear.

ON THE DRAWINGS

FIG. 1 is a schematic plan view of a machine tool of the present invention;

FIG. 2 is a fragmentary, schematic, side elevational view of the machine tool of FIG. 1;

DETAILED DESCRIPTION OF THE PREFERRED EMBODIMENT

Figure 3:
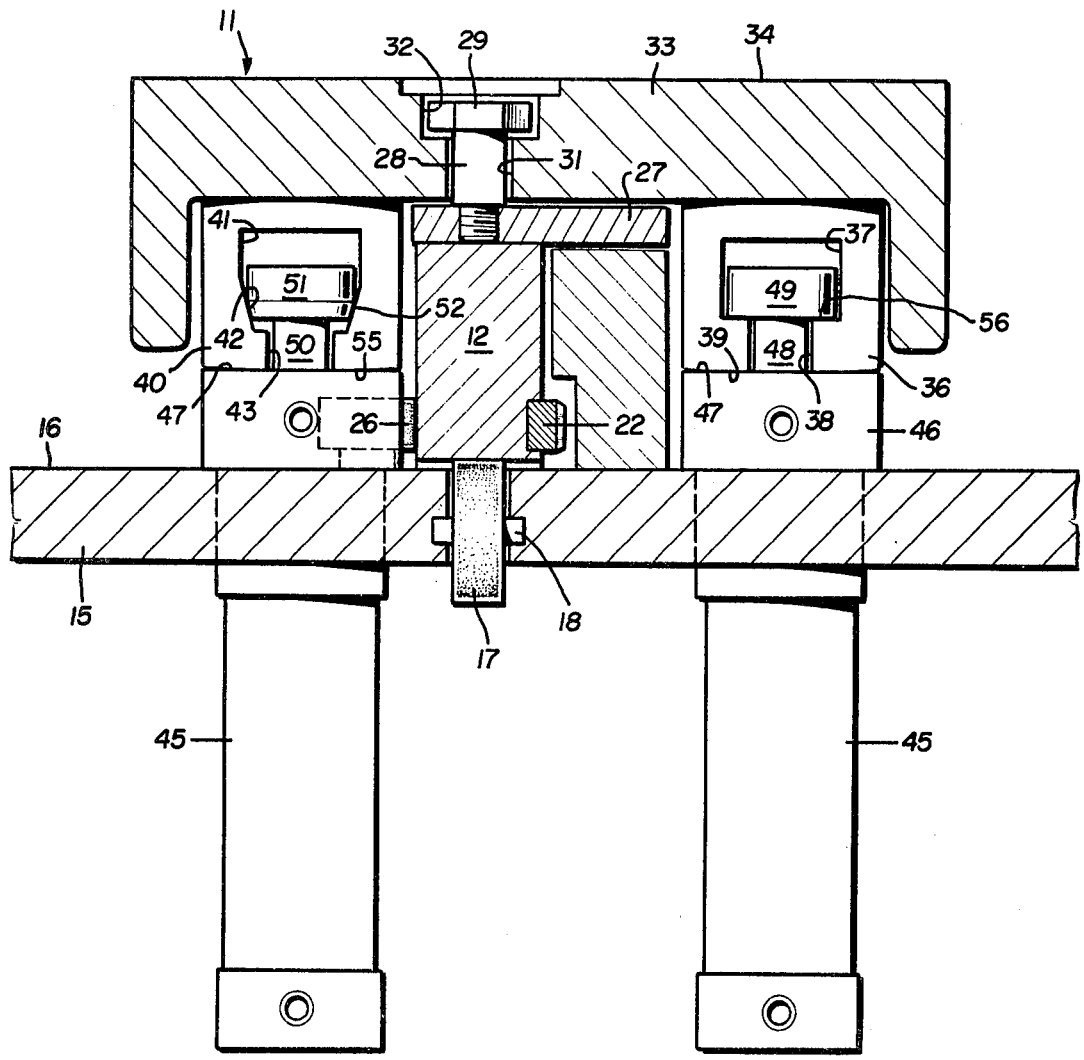
FIG. 3 is an enlarged, fragmentary, sectional view taken along the plane 3—3 of FIG. 1.

In FIG. 1, reference numeral 10 refers generally to a machine tool of the general type illustrated in greater detail in Wiest U.S. Pat. No. 3,609,838, the machine tool consisting of a plurality of pallets 11 carried by an annular transport gear 12 for movement to successive machining locations 13 and to a loading and unloading location 14. The pallets 11 carry on their upper surface parts (not shown) to be machined at each of the machining locations 13 and it is necessary that the pallets be extremely accurately located in alignment with each of the stations 13 for the necessary machining operations.

As best shown in FIG. 3, the machine tool 10 includes a base 15 having a horizontal upper support surface 16. The base 15 is shown as annular, although the base may, if desired, be composed of individual support stands arranged in a composite annular array and underlying the gear 12. The gear 12 is supported on a plurality of rollers or bearing elements 17 mounted on the base 15 to be freely rotatable about axles 18 and to contact the undersurface 19 of the gear. As shown, four such rollers 17 are provided, and the undersurface of the gear 12 is provided with arcuate cam recesses 20 of a size and location to simultaneously receive the four rollers 17. As best shown by a comparison of FIGS. 4 and 5, entry of the rollers into the recesses 20 lowers the gear relative to the support 15 and, if desired, into contact with the upper surface 16 of the support 15.

As best shown in FIGS. 1 and 3, the gear 12 is provided with outwardly directed gear teeth 22 which mesh with a drive pinion 23 driven by a drive train 25. The gear is positioned laterally by a plurality of thrust rollers 26 contacting the inner periphery of the gear. Secured to the top of the gear at four locations (in the illustrated embodiment) are mounting plates 27 carrying mounting bolts 28 having enlarged heads 29 for securing a pallet 11 to each of the mounting plates 27. Each pallet 11 is provided with an enlarged bore 31 through which the shank of the bolt 28 projects and an enlarged recess 32 into which the head 29 of the bolt projects to loosely interconnect the pallet 11 with the gear 12, the clearance between the bolt shank 28 and the bore 31 and the bolt head 29 within the recess 32 forming a lost motion connection therebetween.

Each pallet 11 is provided with a central support portion 33 having an upper support surface 34 upon which are supported the parts to be machined. The support portion 33 of the pallet 11 is provided with two depending bosses 36 pierced by rectangular openings 37 opening downwardly through lower openings 38. Each pallet 11 is provided with two additional bosses 40 pierced with openings 41 opening through tapered surfaces 42 through a lower opening 43.

Positioned at each machining station are four fluid pressure cylinders 45, these cylinders depending from the support 15 and having upper extremities 46 overlying the surface 16 of the support 15 to provide an upper abutment surface 47 adapted to contact the lower extreme surfaces 39 of the embossments 36 and to contact the lower extreme surfaces 55 of the embossments 40.

Those cylinders 45 aligned with the embossments 37 are provided with piston rods 48 terminating in enlarged heads 49 enterable into the openings 37 when the pallet 33 is positioned at a machining station. Actuation of the cylinder 45 to retract the head 49 downwardly will engage the head 49 with the bottom surface 56 of the opening 37 to pull the abutment 36 and the pallet 11 attached thereto downwardly until the abutment surface 39 bottoms on the abutment surface 47.

Those cylinders 45 aligned with the embossments 40 are provided with piston rods 50 having enlarged heads 51 enterable into the openings 41 of the embossments 40 with conical surfaces 52 of the heads 51 engaging the tapered surfaces 42 of the embossment openings 41. The arrangements of the cylinders 45 and of the embossments 36, 40 are similar to the arrangement of the Wiest patent.

Figure 4:
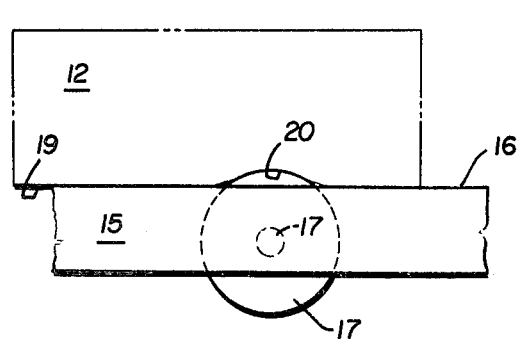
FIGS. 4 and 5 are schematic illustrations of the gear and bearing arrangement of the present invention for raising and lowering the gear.
Figure 5:
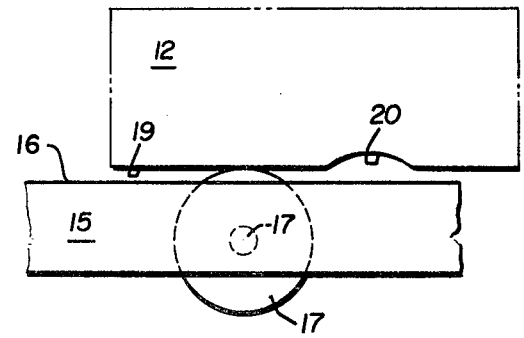

In the operation of the device of the present invention, it will be appreciated that, during transport of the pallets 11 from one machining station to the next, the gear 12 is raised from its position of FIGS. 3 and 4 to its position of FIG. 5, and the piston rods 48 and 50 are extended vertically upwardly. At this time, the pallets 11 and the parts loaded thereon are supported directly by the gear 12 through the support brackets 27. The weight of the pallet 11 and the parts thereon holds each pallet 11 downwardly against the brackets 27, and the lost motion connection of the bolt 28 in the bore 31 limits any movement of the pallet 11 relative to the gear 12.

When the pallets 11 are each roughly vertically aligned with a station 13, 14, the recesses 20 in the undersurface of the gear 12 is aligned vertically with the adjacent rollers 17 and, upon entry of the rollers 17 into the adjacent recesses 20, the gear 12 is lowered to its position of FIG. 3. It will be noted from FIG. 4 that each of the rollers 17 fits quite snugly into the adjacent recess 20 without any substantial longitudinal lead-in. The extent of the vertical movement of the gear 12 is quite small, preferably about 0.015 inches, and this slight degree of movement, plus the snugly fitting configuration of the recesses 20, insures substantially true vertical movement of the gear 12 between its raised and lowered position.

Of course, movement of the gear 12 and the pallet 11 into rough alignment with a machining station 13, 14 telescopically inserts the clamping heads 49, 51 into the recesses 37, 41, respectively. The clamping heads 49 and the locating heads 51 are diametrically or diagonally arranged as indicated in FIG. 1.

The lowering of the gear 12 by entry of the rollers 17 into the recesses 20 simultaneously lowers the pallet 11 until the pallet abutment surfaces 39, 55 formed on the embossment 36, 40, respectively, contact the fixed abutment surfaces 47, as illustrated in FIG. 3. Further vertical movement of the gear moves the gear 12 and the support surfaces 29 downwardly relative to the pallet 11. Assuming that there was a clearance of from about 0.010 to about 0.005 between the abutment surfaces 39–47 and 43–47 when the gear was raised, it will be seen that lowering of the gear 12 through a distance of about 0.015 inches would finally space the gear 12 and the support surface 27 beneath the pallet 11 with a clearance ranging from 0.005 to about 0.010 inches. Once the gear has been lowered, the cylinders 45 are actuated. The initial action of the cylinders 45 is to abut tapered surface 52 of the head 51 with the tapered surfaces 42 of the embossment 40, this contact will shift the pallet 11 to a desired final, accurate machining position by virtue of the matching tapered fits. Immediately thereafter, the flat undersurface of the cylindrical head 49 bottoms in the recess 37 of the embossments 36 and the pallet 11 is finally fixed and clamped in its located machining position.

After the machining operation is complete, the pinion gear 23 is actuated by the driving mechanism 25 and the gear 12 is rotated through its next arc of movement. Initial movement of the gear 12 will move the recesses 20 away from the rollers 17 with the result that the rollers 17 will contact the undersurface 19 of the gear, thereby elevating the gear 12. Of course, the clamping cylinders 45 have been released prior to actuation of the gear 12. Elevation of the gear 12 will contact the support plates 27 with the undersurface of the pallet 11, elevating the pallet 11 for indexing movement with the gear 12.

It will, of course, be understood that the number and spacing of the machining stations 13, 14 can be varied, that the numbers of support rollers 17 and recesses 20 may be varied to provide the necessary support for the gear 12, and that the dimensional relationships above described in connection with the raising and lowering of the gear 12 may also be varied without departing from the inventive concept of this invention.

I claim:

1. In a method of machining, wherein an annular gear supportingly engages a plurality of pallets each carrying a part to be machined and rotation of the gear presents each part to successive machining stations located peripherally about the gear, the improvement of accurately positioning each pallet at its machining station by the steps of:
   (1) rotating the gear to roughly align each pallet with a machining station;
   (2) substantially simultaneously (a) halting the gear and (b) lowering the gear;
   (3) during the performance of Step (2), (a) depositing each pallet on a supporting means located adjacent the aligned machining station and (b) disengaging each deposited pallet from the gear; and
   (4) adjusting each pallet on its supporting means independently of said gear into accurate alignment with the aligned machining station; and
   (5) clamping the accurately aligned and positioned pallet at its machining station independently of the gear.

2. In a method of machining, wherein an annular gear carries a plurality of pallets each carrying a part to be machined and rotation of the gear presents each part to successive machining stations located peripherally about the gear, the improvement of accurately positioning each pallet at its machining station by the steps of:
   (1) rotating the gear to roughly align each pallet with an adjacent machining station;
   (2) substantially simultaneously (a) halting the gear and (b) vertically displacing the gear;
   (3) during the performance of Step (2)(b), supporting each pallet independently of the gear; and
   (4) securing each independently supported pallet in accurate alignment with the adjacent machining station.

* * * * *